June 8, 1937. J. W. LEIGHTON Re. 20,399
LINK CONNECTER FOR AUTOMOTIVE VEHICLES
Original Filed April 20, 1933
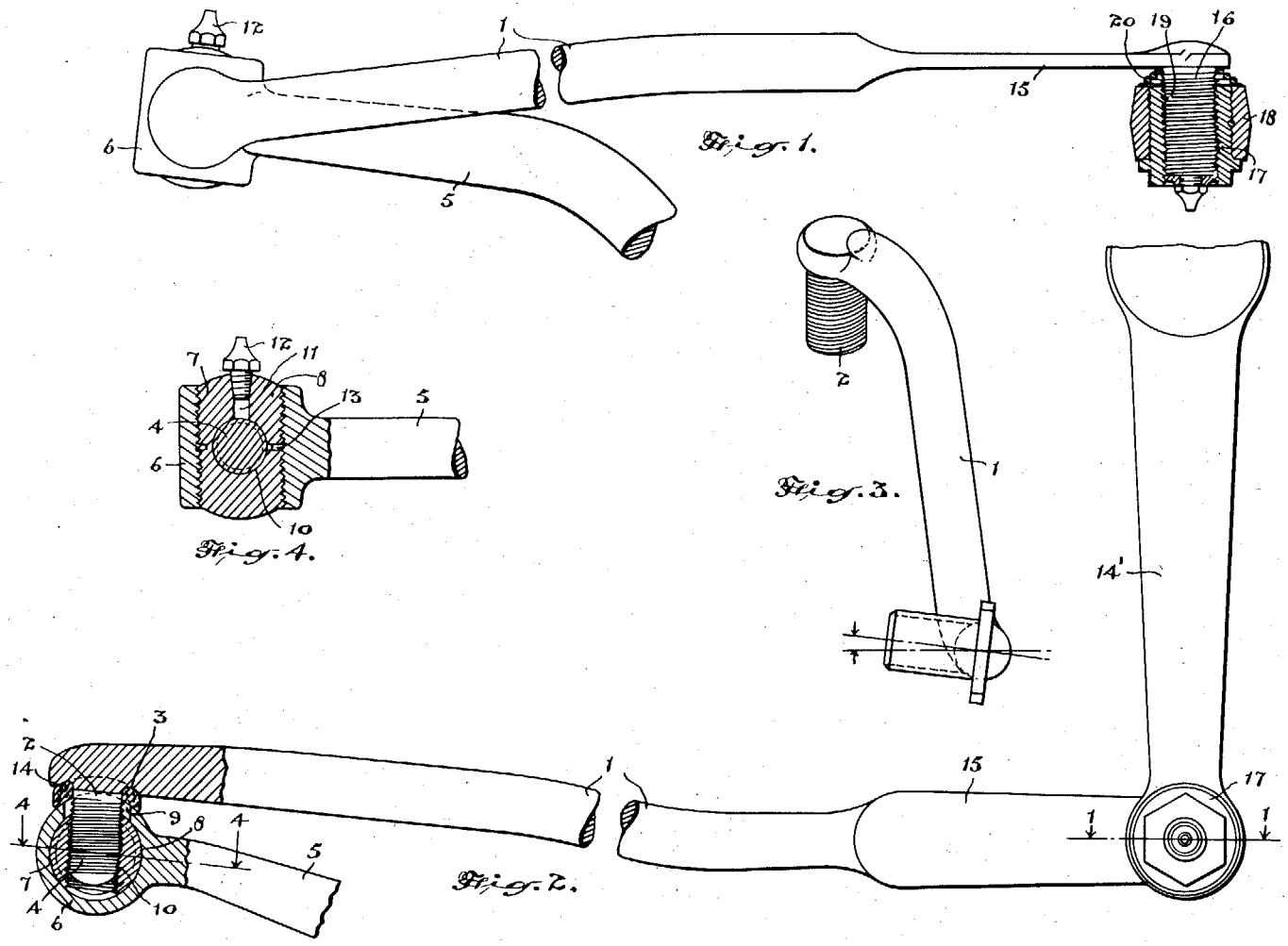
Inventor.
John Wycliffe Leighton.
by A. J. S. Dennison
atty.

Reissued June 8, 1937

Re. 20,399

UNITED STATES PATENT OFFICE 20,399

LINK CONNECTION FOR AUTOMOTIVE VEHICLES

John Wycliffe Leighton, Port Huron, Mich.

Original No. 1,994,582, dated March 19, 1935, Serial No. 667,015, April 20, 1933. Application for reissue March 18, 1937, Serial No. 131,685

5 Claims. (Cl. 74—579)

The principal objects of this invention are to provide a link and joint construction for connecting articulated parts of automotive vehicles which will have extraordinary wearing properties and will require no adjustments and which will be free from rattles or squeaks.

A further object is to devise a structure which will be extremely rugged and may be easily and quickly assembled.

A further and important object is to provide a joint structure which will retain its lubrication for an extraordinary period and will require the minimum of attention.

The principal feature of the invention consists in the novel arrangement of a pair of angularly-disposed threaded bearing portions of a link forming an articulated connection between a pair of relatively movable parts and in the arrangement of threaded bearings to engage the said angularly disposed bearing portions of said link to permit the free swinging of said link and relatively movable parts, said link being tensioned tortionally to maintain a pressure contact between the engaging threaded surfaces.

In the accompanying drawing, Figure 1 is a plan view of a drag link and a portion of the front axle steering arm of a motor vehicle embodying this invention, the bearing connection between the drag link and the main steering arm being shown in section through the line 1—1 of Figure 2.

Figure 2 is a side elevational view of the structure shown in Figure 1 with the front end connection between the drag link and the front axle steering arm in vertical section.

Figure 3 is an end elevational view of the drag link showing the tortional offset of same.

Figure 4 is a horizontal sectional view through the bearing end of the front axle steering arm through the line 4—4 of Figure 2.

The preferred form of bearing is shown in the connection between the drag link and the front axle steering arm.

The drag link 1 which is bent longitudinally to conform to the requirement of the particular vehicle it is designed for is formed with a right angularly arranged downwardly projecting stud 2 preferably forged as a solid part of the drag link, and the underside of the drag link surrounding the stud is preferably shaped with a concaved cupped surface 3.

The outer end 4 of the stud is provided with a threaded bearing surface which is suitably hardened.

The front axle steering arm 5 is formed with a cylindrical end 6 which is threaded from end to end with an internal threaded bearing surface 7.

A cylindrical block 8 externally threaded to fit the threaded orifice 7 in the end of the axle steering arm is threaded thereinto and the cylindrical end 6 of the axle steering arm is formed with a circular orifice 9 in the top side which is of considerably larger diameter than the threaded portion 4 of the extension 2 of the drag link. The block 8 is provided with a transverse threaded orifice 10, into which the threaded end 4 of the drag link stud extends, the thread of the stud engaging the thread of the block in a snug bearing fit.

A lubricating orifice 11 extends in from one end of the block 8 to the vertical threaded orifice 10 and is provided with a suitable lubricant fitting 12.

An orifice 13 is preferably cut through the threaded side wall of the block 8 to convey lubricant to the threaded bearing surface between the block 8 and the threaded orifice 7.

A suitable washer 14 preferably of felt, surrounds the base of the extension 2 and fits snugly between the cupped underside of the drag link and engages the outer surface of the end of the steering wheel arm, thus protecting the threads of the stud extension and block 8 from contact with outside grit or dirt.

The joint thus described is extremely simple, but it is very efficient in use. It permits of a free swinging movement in the plane of the operation of the front axle steering arm on the axis of the threaded stud extension of the drag link, and the block 8 rotates on its axis to permit the slight up and down swinging movement required by the drag link.

This same form of joint may be provided at the other end of the drag link where it is connected to the main steering arm 14′, but I have shown in Figure 1 a slightly different form of construction. The drag link is preferably formed with a flattened section 15 adjacent to its end and is provided with a threaded stud extension 16 which projects at right angles therefrom, the axis of the said threaded portion 16 being offset with relation to the axis of the threaded member 4 so that in assembling the several members a torsional stress will be placed upon the link member resulting in a constant pressure engagement of the engaging bearing surfaces.

A sleeve 17 is threaded into the eye-end 18 of the arm 14′ and is provided with a threaded bearing inner surface 19 to rotatably engage the threaded surface of the stud 16.

It will be seen that the drag link 1 may swing freely on the threaded bearing supports provided between the stud 16 and the sleeve 17 and the flattened portion 15 of the drag link permits a slight flexure.

I have shown a helical spring 20 arranged between the steering arm 14 and the drag link 1 to maintain a constant tension on the threaded bearing surfaces, but it is preferable to construct the drag link with a tortional twist such as is shown in Figure 3 with the stud 16 set at an offset angle in relation to the axis of the stud 2 so that when the drag link is assembled in position with the latter extending in a direction transversely of the bearing orifice 7 there will be a constant pressure engagement exerted between the threaded surface of the coupling members. This strain will not be sufficient to detract from the effective strength of the drag link, but will maintain sufficient tension on the threads compensating for wear and preventing any tendency to rattle and will ensure the contact of the bevelled faces of the threads in all the members at all times.

What I claim as my invention is:—

1. In a steering gear connection for automotive vehicles, a link having a threaded bearing extension, an arm to be connected with said link having a threaded orifice, and a member threaded in said orifice having a threaded bearing orifice to receive in rotative engagement the threaded extension of the link, said link being disposed in a direction transversely of the threaded bearing orifice of said arm and being tensioned tortionally for the purpose of maintaining the respective threaded bearing surfaces of said steering gear members in pressure contact to prevent rattle and compensate for wear.

2. In a steering gear, a link having a rigid right angular extension at the end and a cup-shaped surface surrounding said extension, said extension being externally threaded, an arm having an orifice to receive said link extension and to permit lateral movement therein, a resilient washer encircling said stud and fitting in said cupped recess and engaging the exterior of the arm surrounding its orifice, a threaded orifice extending through said arm in transverse relation to the aforesaid orifice, a block threaded in the latter orifice in said arm having a transversely disposed threaded orifice intermediate of its length adapted to register with the first-mentioned orifice and receiving in bearing engagement the threaded link extension, and means for carrying lubricant to the threaded surfaces.

3. In a steering gear connection, a link having a rigid angularly projecting stud formed with a threaded bearing surface, a steering arm having a threaded orifice therein and an orifice leading to the threaded orifice intermediate of its length of a size to receive the threaded stud and permit lateral movement thereof, a block threaded into the threaded orifice of said arm in rotative bearing engagement, said block having a transverse threaded orifice receiving the threaded stud in rotative bearing engagement, said entire complement of members being retained in their cooperative assembled relation solely by the respective threaded bearing engagements of said block with said link and arm, and means cooperating with said link and maintaining same under torsional tension to maintain intimate bearing contact and prevent looseness between the respective threaded bearing surfaces of said link, arm and block.

4. In a vehicle, the combination with parts having a pair of threaded bearing orifices, of a link having angularly arranged threaded extensions adapted to engage said bearing orifices, said link being tensioned tortionally to maintain a pressure contact between the engaging threaded surfaces.

5. A vehicle structure having paired threaded bearing orifices, and a link having right-angularly threaded extensions arranged in angular relation to each other and having their threaded ends engaging in threaded bearing engagement with the threads of said bearing orifices, said link when assembled with its threaded ends in said orifices being tensioned tortionally to maintain a pressure contact between the engaging threaded surfaces.

JOHN WYCLIFFE LEIGHTON.